United States Patent [19]

Mechalas

[11] 3,954,347
[45] May 4, 1976

[54] DRILLING MACHINE

[75] Inventor: Emmanuel Mechalas, Danville, Ill.

[73] Assignee: Modern Machine Shop Inc., Danville, Ill.

[22] Filed: Sept. 25, 1974

[21] Appl. No.: 509,240

[52] U.S. Cl. ................................. 408/31; 408/99; 408/113; 408/136; 408/205; 144/1 R; 144/27
[51] Int. Cl.² .................. B23B 41/00; B23B 51/00
[58] Field of Search ............ 408/31, 113, 136, 205, 408/99, 117, 234, 67, 68, 703, 204; 144/27, 1 R, 49, 67

[56] References Cited
UNITED STATES PATENTS

| | | | |
|---|---|---|---|
| 106,120 | 8/1870 | Carey et al. | 408/31 |
| 1,348,190 | 8/1920 | Wahl | 408/205 |
| 3,130,763 | 4/1964 | Schlosser et al. | 408/205 |
| 3,313,327 | 4/1967 | Goldstein | 144/27 X |
| 3,319,672 | 5/1967 | Phelps | 144/27 X |
| 3,610,768 | 10/1971 | Cochran | 408/204 |

*Primary Examiner*—Gil Weidenfeld
*Attorney, Agent, or Firm*—Neal J. Mosely

[57] ABSTRACT

An improved drilling machine for cutting holes for knobs and latches in metal-clad doors comprises a supporting framework for the door and a hollow drill arranged to be moved upward from the underside of the door to cut the knob opening. The drill is hollow in construction and is supported on a drive shaft by a plurality of support members spaced a sufficient distance apart to effect an easy discharge of the core which is cut and drops through the center of the hollow drill bit or cutter. In addition, the drill bit or cutter, which is hollow in construction, has the individual cutting teeth cut at an angle such that the innermost part of the cut is completed through the metal cladding on the door before the cutter begins to cut the wooden portion thereof.

6 Claims, 4 Drawing Figures

3,954,347

DRILLING MACHINE

BACKGROUND OF THE INVENTION

1. Field of the Invention

This invention is concerned with a new and improved drilling machine and cutting bits or cutters therefor and more particularly to drilling machines which are especially adapted to the drilling of metal-clad doors to provide a hole for the knob and lock mechanism and another hole for the latch mechanism. The novel drilling machine is for the processing of metal-clad doors which have come into extensive use for protection of homes and offices and the like against unlawful entry. The drilling of the knob and lock mechanism opening on a metal-clad door requires a different drilling or cutting mechanism than has been customarily used. This invention therefore is concerned with an improved drilling apparatus constructed especially for handling the drilling of metal-clad doors to provide the bore for receiving the lock mechanism and handle of the door knob and another opening for the latch portion of the knob and lock assembly. In drilling mechanisms for drilling holes in metal-clad doors one important and necessary feature is an arrangement for ejection of the core which is cut out by the hole cutter. Another feature which is important in a drilling machine of this type is the provision of a hole cutter or hole saw which will cut through the metal-clad portion and the innermost diameter of the hole cut so that the core of metal which is cut will not interfere with the cutting of the wooden door inside.

2. Description of the Prior Art

A variety of patented hole cutting saws or machines are illustrated in the prior art. Typical hole cutting saws or machines are illustrated in U.S. Pat. Nos. 508,795; 1,348,190; 2,606,615; 2,978,002; 3,130,763; and 3,574,946. These patents disclose or teach a variety of forms of hole cutting apparatus and some include features for discharge of the core which is cut in forming a hole in the material being processed. None of these prior art devices, however, disclose a hole cutter in which the core drops after it is cut and is ejected automatically through the support mechanism for the hole cutter or hole saw. Also, none of the prior art discloses a hole cutter in which the cutting teeth are designed to cut through a metal-clad wooden object, such as a metal-clad door, in such a manner that the innermost portion of the hole is cut through the metal cladding before the cutter begins to cut into the wooden core inside. This feature is essential in the cutting of metal-clad objects to prevent the disc of metal which is cut out first from interferring with the operation of the cutter in cutting out a core from the wooden core within the metal cladding.

SUMMARY OF THE INVENTION

This invention comprises a new and improved drilling machine including a hole cutter or hole saw of general application for cutting holes in various objects but which is particularly designed and adapted to a cutting of holes in metal-clad doors for the knob and lock mechanism to be installed in said door. The apparatus includes a hollow hole cutter which is reciprocated up and down to cut through a metal-clad door from the underside and a laterally movable drill aligned with the hole cut by the hole cutter for cutting into the edge of the door to provide a latch opening. The hole cutter is of a special design having teeth which cut first at the innermost diameter of the cut so that the cutting through the metal cladding results in a metal disc being cut of minimum size which does not interfere with the operation of the hole cutter in cutting on through the wooden core of the metal-clad door. In addition, the hollow hole cutter or hole saw is supported on a supporting frame which is connected to the rotating shaft of the motor which drives the cutter. The supporting frame includes a plurality of spaced supporting members, preferably three in number, which are spaced sufficiently far apart to provide an opening of sufficient size to eject the wooden core and the metal disc cut by the hole cutter in cutting through the metal-clad door. The apparatus is assembled with suitable foot and hand operated leverage mechanisms for moving the cutters to provide a rapid and efficient cutting of knob and latch openings in a metal-clad door. While the apparatus is designed primarily for the cutting of knob and latch openings for metal-clad doors, the hole cutter or hole saw is a device of general application which may be used for cutting holes in any desired object.

DESCRIPTION OF THE PREFERRED EMBODIMENT

Figure 1:
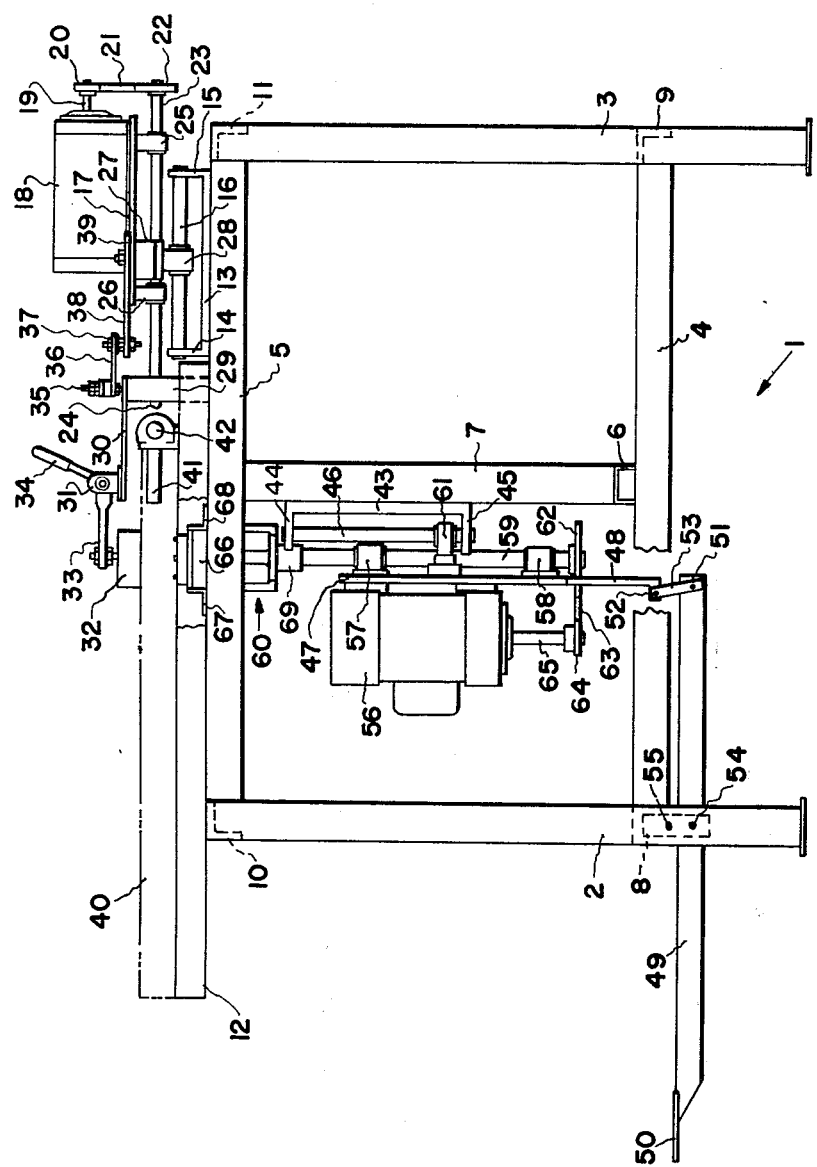
FIG. 1 is a view in side elevation of the improved drilling machine comprises a preferred embodiment of this invention.

Referring to the drawings by numerals of reference, and more particularly to FIG. 1, there is shown an assembly view, in side elevation, of a new and improved drilling machine which is particularly designed and adapted for cutting the knob and latch openings in metal-clad doors. The drilling machine, generally designated 1, comprises a metal frame consisting of vertical legs 2 and 3 and horizontal supporting members 4 and 5 respectively. The frame has similar vertical and horizontal supporting members which lie behind the ones shown and which would be seen in a plan or end view but are unnecessary to the general description of the apparatus. The vertical and horizontal supporting members are of either an angle iron or channel iron construction. The central portion of the horizontal supporting member 4 is broken away to show the connection between a foot operated lever and the mechanism for driving the hole saw or cutter which is an essential improved feature in this drilling apparatus. There is also provided a channel-shaped supporting iron 6 which extends horizontally at right angles to supporting member 4 and is supported on its other end by a horizontal supporting member corresponding to supporting member 4 lying behind that supporting member on the other side of the frame. Toward the middle of channel member 6 there is provided a vertically extending channel-shaped supporting iron 7 which extends upwardly to the middle portion of the top of the supporting frame for the apparatus where it is connected to supporting member 5 and the corresponding member lying behind supporting member 5 by a horizontally extending supporting member extending at right angles to supporting member 5 and corresponding approximately to the channel-shaped member 6.

The complete framework which supports the drilling apparatus therefore consists of a rectangular structure comprising vertically extending supporting members 2 and 3 connected by horizontal members 4 and 5. As noted above, members extending vertically and horizontally, respectively, and corresponding to the members seen in FIG. 1 lie behind those members and are unseen in the view shown in FIG. 1. The framework shown in FIG. 1 is connected to the corresponding vertical supporting members by laterally extending members 8, 9, 10 and 11, respectively, which extend at right angles to the corresponding members as shown in FIG. 1. The entire structure is connected together by welding or other suitable connecting means.

At the upper end of the framework, there are provided a pair of supporting members 12, only one of which is seen in FIG. 1. Supporting members 12 are positioned on the top of the frame along supporting member 5 and the corresponding member which lies on the other side of the apparatus which is not seen. Supporting member 12 may be of any suitable construction although it is preferably of wood and provides a support for the metal-clad door which is to be processed on this drilling apparatus. Supporting member 12 is broken away in the view shown in FIG. 1 to show the drill mechanism which is moved up from the underside of the door for cutting a knob and lock opening therein.

At the right end of the upper portion of the supporting frame there is provided a U-shaped supporting member 13 having upwardly extending arms 14 and 15, respectively, which support rod 16 along which the horizontal drilling portion of the apparatus is moved. The horizontal portion of the drilling apparatus comprises a supporting plate 17 on which there is supported electric motor 18 which drives shaft 19 provided with a small sprocket gear 20. Small sprocket gear 20 drives a chain drive 21 which operates a larger sprocket gear 22 on shaft 23 which carries drill bit 24 at its extreme left-hand end. Rod 23 is supported in bearing members 25 and 26, respectively, which are supported on the underside of plate 17 which supports motor 18. The supporting plate 17 is also provided with supporting abutment 27 which is connected to and supported on bearing member 28 which is slidably supported on rod 16. The supporting plate 17 and motor 18, as well as the inner connecting driving mechanism and drill bit 24 are all supported for longitudinal movement from right to left and left to right on supporting rod 16 as viewed in FIG. 1.

The apparatus is also provided with a vertical supporting member 29 which extends upward from supporting member 5 and has a laterally extending plate 30 extended to the left as viewed in FIG. 1. At the left end of supporting plate 30 there is provided an abutment 31 on which there is pivotally supported a clamping member 32 carried on arm 33 and operated by lever 34. On supporting plate 30 there is also pivotally supported at 35 a lever 36 which is pivotally connected at 37 to arm 38 connected to supporting plate 17 and the end of the lever 39 being operable on movement to cause supporting plate 17 to move reciprocally along supporting rod 16. The movement of the end portion 39 of the lever mechanism is operable to move supporting plate 17 and the associated apparatus reciprocally along supporting member 16 to move drill bit 24 into or out of engagement with the end portion of the metal-clad door which is being processed on the drilling apparatus.

In FIG. 1, the metal-clad door 40 is shown in position clamped on supporting members 12 and held by clamp 32 to be drilled by horizontally movable drill bit 24 to provide a latch opening in the end of the door and by a vertically movable hole cutter or drill which will be described in more detail. The door is located in predetermined position by guide member 41 which is supported on a rod 42 supported on frame 5.

The vertically movable drill mechanism or hole cutter is shown as an assembly in FIG. 1 and the hole saw or cutter of novel design is shown in more detail in the other figures. Vertically supporting member 7 is provided with "U" shaped supporting member 43 having end members 44 and 45 which support guide rod 46 on which the vertically movable drill mechanism is reciprocally moved.

The vertically movable drill mechanism comprises a supporting plate 47 which has a "U" shaped extension at its lower end connected to a pedal 49 for vertical movement. Pedal 49 has a flat foot plate 50 at one end and is pivotally connected as at pivot points 51 and 52 by pedal member 53. Pedal member 49 is pivoted as at 54 on a pair of supporting members 55 extending downward from and secured on laterally extending angle iron 8 which extends between vertical supporting leg 2 and the corresponding leg which extends vertically behind leg 2 at the opposite side of the supporting frame. Actuation of pedal 49 will cause supporting plate 47 to be moved up and down along supporting rod 46.

An electric motor 56 is supported on plate 47 and is provided with bearing members 57 and 58 which support drive shaft 59 for the hole cutter 60 which is shown in more detail in the other view. Supporting plate 47 is also provided with supporting bearing 61 which slides along rod 46 for reciprocal movement of supporting plate 47 in a vertical direction. Drive shaft 59 carries a large sprocket gear 62 at its lower end which is driven by chain drive 63 which in turn is operated by a smaller sprocket gear 64 on drive shaft 65 from electric motor 56. When the apparatus is being used to cut a knob and lock opening in metal-clad door 40, peddle 49 may be operated to move the entire drill mechanism including supporting plate 47, motor 56, hole cutter 60 and the intermediate drive structure reciprocally in a vertical direction. As will be described in more detail later, the hole cutter 60 cuts through the metal-clad door from the underside and cuts a circular opening for the insertion of the lock and knob mechanism in the door. The core which is cutout by the hole cutter 60 drops downward and is ejected from the hole cutter as will be described more fully in connection with the more detailed description of the hole cutter in FIGS. 2, 3 and 4. The hole cutter 60 is guided for accurate vertical reciprocal motion in guide bushing 66 which is supported by angle iron members 67 and 68 extending between horizontal supporting member 5 and corresponding horizontal member at the back of the supporting frame.

Figure 2:
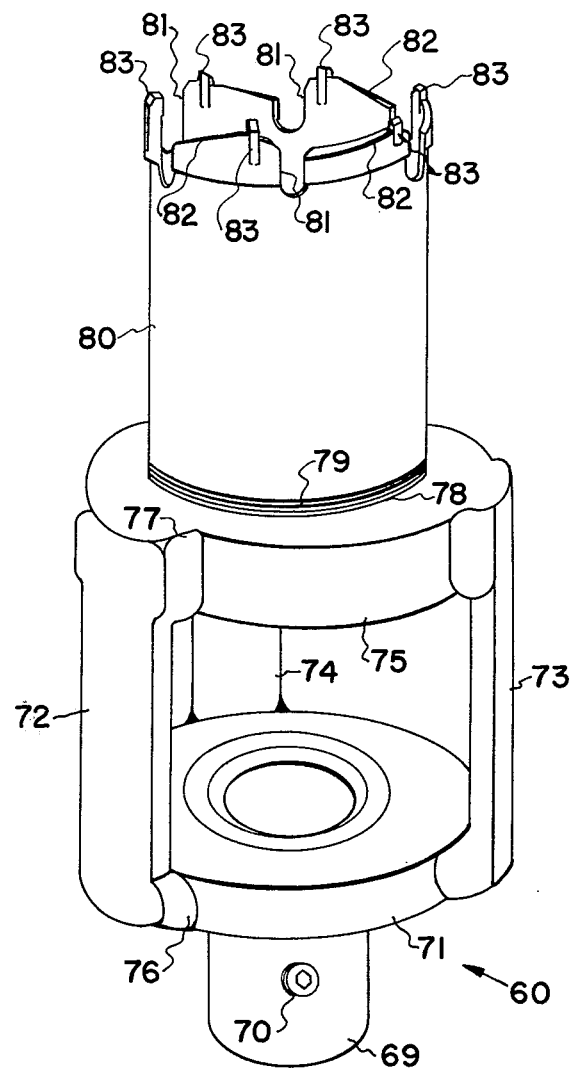
FIG. 2 is an isometric view, somewhat enlarged in relation to FIG. 1, of the novel hole cutter or hole saw used in this drilling machine.
Figure 3:
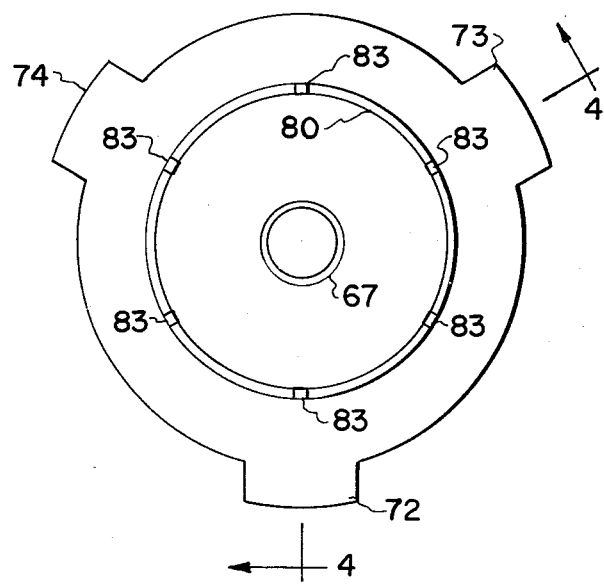
FIG. 3 is a view in end elevation, viewed from the cutting end, of the hole cutter or hole saw as shown in FIG. 2.
Figure 4:
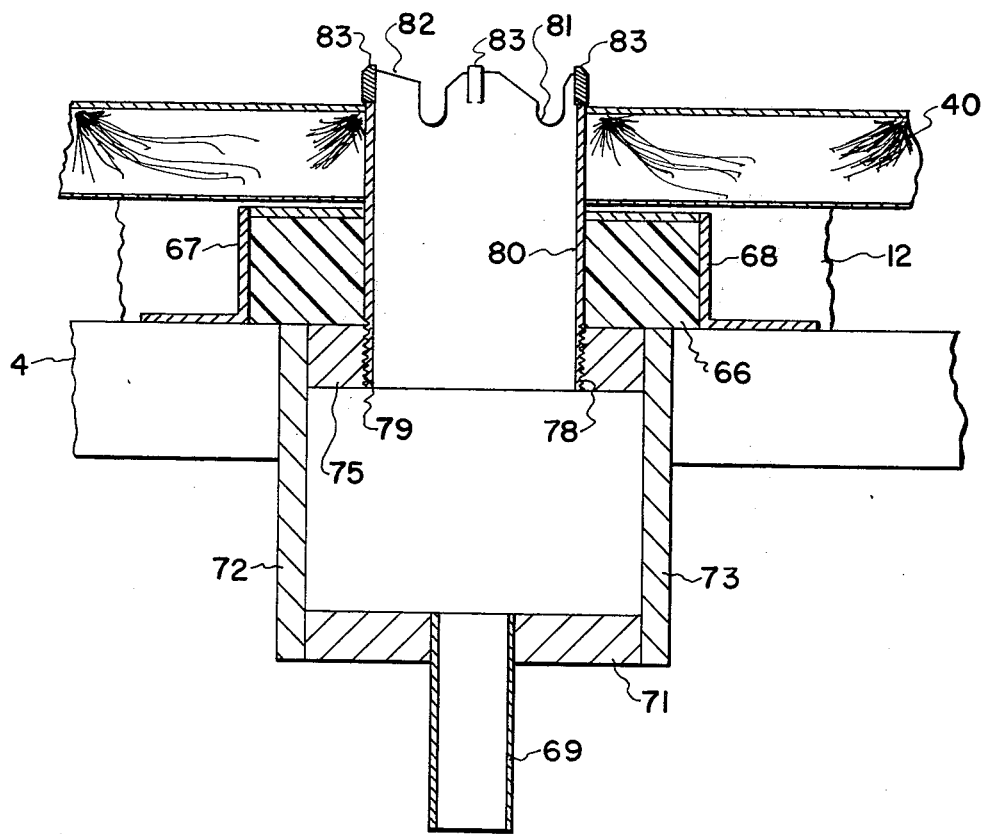
FIG. 4 is a sectional view taken on the line 4—4 of the hole cutter or hole saw shown in FIG. 3 and showing the hole saw or cutter in position just after cutting through a metal-clad door.

In FIGS. 2, 3 and 4, the hole cutter 60 is shown in considerable detail. FIG. 2 shows the hole cutter in an isometric view. FIG. 3 shows a view of the hole cutter in end elevation looking downward on the cutter teeth. FIG. 4 is a sectional view showing the hole cutter in position just after it is cut through the metal-clad door 40 and showing the spacing of the supporting members for the hole cutter which allow for ejection of the core which is cut from the metal-clad door.

Referring more particularly to FIG. 2, it is seen that the hole cutter 60 comprises a hollow shaft portion 69 provided with a set screw 70 for attachment to shaft 59 driven by motor 56. Hollow shaft 69 is secured to and integral with a hollow disc-shaped plate member 71 which is connected by equally spaced and longitudinally extending supporting rods 72, 73, and 74, respectively, which are connected to a disc-shaped supporting member 75. The supporting rods are secured to plate 71 by welding as at 76 and to plate 75 by welding as at 77. The space between the disc-shaped members 71 and 75 is slightly larger than the thickness of the metal-clad door which is to have a circular opening cut therein for installation of a lock and knob assembly. The spacing of supporting members 72, 73, and 74, around the supporting plates 71 and 75, respectively, is slightly larger than the diameter of the core which is cut by the cutter so that the core can be ejected readily from the cutter assembly during operation.

The upper supporting plate 75 is provided with a central opening 78 which is internally threaded to receive the threaded lower end portion 79 of a hollow, cylindrical cutter member 80. The upper end of the hollow cylindrical cutter member 80 is provided with a plurality of notches 81 which define cutter teeth 82 which have hardened metal carbide cutter inserts 83 positioned therein. The cutter teeth inserts 83 are of an extremely hard material such as tungsten carbide or the like or other hardened cutting material which is capable of cutting through metal without excessive wear. Alternate individual cutter teeth inserts are cut with the sharpened edge to the inside of the hollow, cylindrical cutter support 80 so that the initial cutting action is taken along the inside diameter of the cutter. This construction of the cutter teeth is essential to the operation of the drilling machine since it insures that the cutter teeth cut through the metal at the smallest diameter before they begin to cut into the wood of the metal-clad door and thus permit both the metal disc which is produced by the cutting action and the wooden core which is cut by the cutter to drop through the hollow interior of cylindrical support 80 into the space between supporting plates 71 and 75 and be ejected through one of the peripheral openings between supporting members 72, 73, and 74.

OPERATION

The operation of this drilling machine should be obvious from the description of the assembly of the various parts thereof but will be explained in more detail. The drilling apparatus comprises a supporting frame having a longitudinally movable drill assembly moved by lever 17 for cutting a hole for a latch in the edge of a metal-clad door. The apparatus is also provided with a foot pedal operated vertically movable hole cutter assembly including a novel hole saw or cutter which cuts from the underside of a metal-clad door and allows the core which is produced to drop through the cutter and be ejected during operation.

A metal-clad door 40, shown in dotted line in FIG. 1, is positioned on the top of the supporting frame and clamped onto supporting members 12 by clamp member 32 operated by clamp and lever 34. Adjustable stop member 41 determines the positioning of the door on the drilling machine to determine at which the knob and lock hole are to be cut through the door and the point at which the latch hole is to be cut through from the edge into the knob and lock hole.

When the door is clamped in position, motor 18 is turned on to actuate drill bit 24 and lever 39 is moved to cause supporting plate 17, motor 18, drive assembly, and drill 24 to be moved along supporting rod 16. Drill 24 will thereupon drill through the edge of the metal-clad door to provide a cylindrical opening for the latch of the lock assembly to be inserted in the door.

Motor 56 is actuated to rotate hole saw or cutter assembly 60 which was described in more detail above. Actuation of foot pedal 49 by depression of foot plate 50 causes pedal 49 to move yoke 48 and supporting plate 47 upward. The entire supporting plate 47, motor 56 and drive mechanism and hole cutter assembly 60 are moved upward by actuation of pedal 49. Motor 56 and cutter assembly 60 are moved upward while the cutter is rotated at high speed. As the cutter engages the underside of metal-clad door 40 the individual cutter teeth inserts 83 cut through the metal cladding and first release the metal disc which is of the same size as the interior opening of supporting cylinder 80. As the cutter advances further by movement of pedal 49 the cutter teeth cut through the wooden core of the door and through the metal cladding at the upper side of the door. The wooden core which is cut out and the upper metal disc drop through the interior opening of cylindrical support 80 into the space between supporting plates 71 and 75 and are ejected through one of the openings between support members 72, 73, and 74.

The construction of this drilling machine, in general, and of the hole saw or hole cutter, in particular, provides certain distinct advantages. The construction of the drilling machine permits the rapid and efficient handling of metal-clad doors to cut carefully aligned holes through the door for lock and knob assemblies and from the edge for the door latch. The design of the hole saw or cutter has the advantage that the spacing of supporting plates 71 and 75 and supporting members 72, 73, and 74, is such that the core which is cut and dropped through can be ejected while the apparatus is in operation and without the necessity of stopping the cutter to remove the core. The uniform positioning of support members 72, 73, and 74 avoids undue fatigue and irregular twisting of the cutter which would occur in the case of hollow cutter having a side opening larger than the interior diameter thereof. The design of the cutting teeth inserts 83 whereby the highest and sharpest point is located at or inside the inside diameter of supporting cylinder 80 insures that the initial cut through the metal cladding on the metal-clad door results in a metal disc being released which is sufficient small to drop through the internal opening of support member 80. If the cut took place initially at a point farther out then the metal disc which would be cut would be held in place by the rotating cutter and interfere with further cutting operation. In addition, the guide bushing in which hole cutter 60 slides, insures very accurate cutting of the knob opening in the metal-clad door at right angle to the surface of the door.

I claim:

1. A drilling machine comprising a supporting frame for supporting horizontally a flat object to be drilled, a drill supported on said frame and reciprocally movable in the plane of the object being drilled, means to move said drill into and out of the edge of said flat object, a hollow hole cutter supported on said frame below the plane of said flat object and movable reciprocally in a vertical direction, means to move said hole cutter vertically to cut a hole in said flat object from the underside thereof intersecting the hole made by said first-named drill, and said hole cutter comprising a hollow cylindrical member having cutter teeth around the upper end thereof, said teeth having the initiating cutting edge lying along a projection of the inner surface of said cylindrical member, and having an enlarged support comprising a first supporting member having a hollow opening receiving and supporting said hollow cylindrical member, a second supporting member spaced from said first supporting member by a distance greater than the thickness of said flat object and having a shaft for connection to rotary driving means, and a plurality of spaced supporting members securing said first and second supporting members and defining equally spaced openings of size greater than the diameter of the core cut by said hole cutter sufficient to eject the core cut by movement of said hole cutter through said flat object.

2. A drilling machine according to claim 1 including separate motor means for rotating said drill and said hole cutter, and said first-named and second-named moving means comprising a first lever for moving said drill and the motor means therefor and a second lever for moving said hole cutter and the motor means therefor.

3. A drilling machine in accordance with claim 1 in which said hole cutter teeth are of a hard metal-cutting material.

4. A drilling machine in accordance with claim 3 including separate motor means for rotating said drill and said hole cutter, and said first-named and second-named moving means comprising a first lever for moving said drill and the motor means therefor and a second lever for moving said hole cutter and the motor means therefor.

5. An annual cutter for cutting a core from a work piece comprising a hollow cylindrical member having cutting teeth around one end thereof, said teeth having the initiating cutting edge lying along a projection of the inner surface of said cylindrical member, a first disc-shaped member having a center bore, the diameter of said center bore being at least as large as the inside diameter of said cylindrical member, said cylindrical member being secured coaxially to said disc-shaped member, a second disc-shaped member secured to said first disc-shaped member in a coaxial relationship by a plurality of longitudinal supports, said longitudinal supports being radially spaced from the axis of said cylindrical member more than the radius of said cylinder member and spaced from each other more than the diameter of said cylindrical member, and said disc-shaped members being spaced apart a distance greater than the thickness of the work piece, whereby the core can be cut from the work piece and be ejected between the longitudinal supports.

6. A hole cutter in accordance with claim 5 in which said cutter teeth are of a hard metal-cutting material.

* * * * *